United States Patent
Phillips et al.

(10) Patent No.: US 7,590,942 B2
(45) Date of Patent: Sep. 15, 2009

(54) SYSTEM, METHOD AND COMPUTER PROGRAM PRODUCT FOR DOCUMENTING AND MANAGING EXECUTION OF PROCEDURES IN A GRAPHICAL INTERFACE ENVIRONMENT

(75) Inventors: Gary Phillips, Aiken, SC (US); Chris Kourliouros, Waynesboro, PA (US); Kevin Morris, Warrenville, SC (US); Ray Ramsey, Shelby, NC (US)

(73) Assignee: Novatech LLC, Quakertown, PA (US)

( * ) Notice: Subject to any disclaimer, the term of this patent is extended or adjusted under 35 U.S.C. 154(b) by 634 days.

(21) Appl. No.: 10/942,088

(22) Filed: Sep. 16, 2004

(65) Prior Publication Data

US 2006/0059460 A1 Mar. 16, 2006

(51) Int. Cl.
G06F 3/048 (2006.01)
(52) U.S. Cl. ........................ 715/763; 715/762; 715/772; 705/7; 705/11
(58) Field of Classification Search ................. 715/961, 715/965, 966, 967, 762, 763, 772; 705/7, 705/11
See application file for complete search history.

(56) References Cited

U.S. PATENT DOCUMENTS

| | | | |
|---|---|---|---|
| 5,175,812 A | 12/1992 | Krieger | |
| 5,187,797 A | 2/1993 | Nielsen et al. | |
| 5,212,771 A * | 5/1993 | Gane et al. | 715/854 |
| 5,737,727 A * | 4/1998 | Lehmann et al. | 705/7 |
| 5,815,152 A * | 9/1998 | Collier et al. | 715/839 |
| 5,907,706 A | 5/1999 | Brodsky et al. | |
| 6,041,178 A | 3/2000 | Rybarczyk et al. | |
| 6,188,402 B1 | 2/2001 | Csipkes et al. | |
| 6,219,046 B1 | 4/2001 | Thomas et al. | |
| 6,224,385 B1 * | 5/2001 | Nitta et al. | 434/219 |
| 6,246,404 B1 | 6/2001 | Feigner et al. | |
| 6,286,137 B1 | 9/2001 | Bleizeffer et al. | |
| 6,289,513 B1 | 9/2001 | Bentwich | |
| 6,337,696 B1 | 1/2002 | Lindhorst et al. | |
| 6,342,907 B1 | 1/2002 | Petty et al. | |
| 6,346,953 B1 | 2/2002 | Erlikh et al. | |
| 6,380,949 B2 | 4/2002 | Thomas et al. | |
| 6,546,297 B1 | 4/2003 | Gaston et al. | |
| 6,601,232 B1 * | 7/2003 | Burba et al. | 717/100 |
| 6,621,505 B1 | 9/2003 | Beauchamp et al. | |
| 6,643,600 B2 * | 11/2003 | Yanosik et al. | 702/108 |
| 6,662,355 B1 | 12/2003 | Caswell et al. | |
| 6,665,575 B2 | 12/2003 | Betawar et al. | |
| 6,678,889 B1 | 1/2004 | Burkett et al. | |
| 6,788,987 B2 * | 9/2004 | Slechta et al. | 700/106 |
| 7,203,560 B1 * | 4/2007 | Wylie et al. | 700/110 |
| 2001/0028364 A1 | 10/2001 | Fredell et al. | |
| 2002/0066072 A1 | 5/2002 | Crevatin | |
| 2002/0091990 A1 | 7/2002 | Little et al. | |
| 2002/0120921 A1 | 8/2002 | Coburn et al. | |
| 2002/0138449 A1 * | 9/2002 | Kendall et al. | 705/75 |
| 2003/0041314 A1 | 2/2003 | Heeren et al. | |

(Continued)

OTHER PUBLICATIONS

Proficy Change Management, GE Fanuc, http://www.geindustrial.com/cwc/products?pnlid=2&famid=4&catid=15&id=sw005&lang=en_US, accessed Sep. 3, 2004.

(Continued)

*Primary Examiner*—Weilun Lo
*Assistant Examiner*—Tuyetlien T Tran
(74) *Attorney, Agent, or Firm*—Venable LLP; Ralph P. Albrecht; Lars H. Genieser

(57) ABSTRACT

A system, method and computer program product for describing a process visually, converting the visual description to an intermediate format, and directing the process.

37 Claims, 8 Drawing Sheets

U.S. PATENT DOCUMENTS

| | | | |
|---|---|---|---|
| 2003/0107596 A1 | 6/2003 | Jameson | |
| 2003/0154279 A1* | 8/2003 | Aziz | 709/225 |
| 2003/0158760 A1 | 8/2003 | Kannenberg | |
| 2004/0107414 A1* | 6/2004 | Bronicki et al. | 717/105 |
| 2005/0097008 A1* | 5/2005 | Ehring et al. | 705/26 |
| 2006/0026193 A1* | 2/2006 | Hood | 707/102 |

OTHER PUBLICATIONS

Exapilot, Yokogawa, http://www.us.yokogawa.com/IA/DCS/exapilot.htm, accessed Sep. 3, 2004.

Text from Antientropics website, http://www.antientropics.com/Wearable%20Computers/wearcomp.htm, printed Sep. 7, 2004.

About Rhea, Rhea System S.A., http://www.rheagroup.com/main_aboutrhea.htm, accessed Jun. 21, 2004.

Products, Sentel Corporation, http://www.sentel.com/html/products.html, accessed Sep. 7, 2004.

RSBizWare eProcedure, Technical Data, Rockwell Automation.

Integrated Vehicle Health Management (IVHM), Honeywell International Inc., May 2001.

PressReleases, Sentel Corporation, http://www.sentel.com/html/pressrelease_81230.html, accessed Sep. 7, 2004.

iBatch, Boost efficiency, increase ROI and meet regulatory demands, GE Fanuc Internaitonal, Inc. © 2003.

Cimplicity™ Manager, GE Fanuc Automation, © 2001.

InBatch™ 8.0—Premier and FlexFormula Editions, Invensys Systems, Inc., © 2002.

Software automates manual operations [Yokogawa], Thomas Publishing Company, © 2004, pp. 1-16, http://www.industrialnewsroom.com/fullstory/19485, accessed Sep. 3, 2004.

MOIS$_5$ Toolset Description, Rhea System S.A., Jan. 8, 2004, pp. 1-27.

ARC Advisory Group Rave Reviews, GE Fanuc, http://www.gefanucautomation.com/special/arc.asp, accessed Dec. 20, 2004.

Proficy™ Batch Execution, GE Fanuc, http://www.gefanucautomation.com/products/intellution_dynamics/ibatch/default.asp, accessed Dec. 20, 2004.

Feature, GE Fanuc, http://www.gefanucautomation.com/products/intellution_dynamics/ibatch/iBatch_Features.asp, accessed Dec. 20, 2004.

Benefits, GE Fanuc, http://www.gefanucautomation.com/products/intellution_dynamics/ibatch/iBatch_Benefits.asp, accessed Dec. 20, 2004.

Software Solutions: Vendors, InSource Solutions, http://www.insourcess.com/Soft_Vendors.html, accessed Dec. 20, 2004.

Device Integration, FactorySuite® 2000 I/O Servers, InSource Software Solutions, http://www.insourcess.com/Products_Wonderware_DeviceInteg.asp, accessed Jun. 4, 2004.

InBatch™ Premier, InSource Software Solutions, http://www.insourcess.com/Products_Wonderware_InBatchPremier.asp, accessed Jun. 4, 2004.

Exapilot Builder Function, Yokogawa Systems, http://www.yokogawa.com.au/Products/systems/business_management/exapilot_builder_fn.htm, accessed Sep. 3, 2004.

Exapilot Operations Function, Yokogawa Systems, http://www.yokogawa.com.au/Products/systems/business_management/exapilot_operations_fn.htm, accessed Sep. 3, 2004.

Cimplicity Manager—Features & Benefits, GE Fanuc, http://www.geindustrial.com/cwc/products?pnlid=2&id=fb, accessed Sep. 3, 2004.

RSBizWare Batch, Rockwell.

RSBizWare eProcedure, Rockwell Software, http://www.software.rockwell.com/rsbizwareeprocedure/, accessed Dec. 22, 2004.

The OPC Foundation, http://www.opcfoundation.org/, accessed Jun. 22, 2004.

Products, Rhea System S.A., http://www.rheagroup.com/main_prodcuts.htm, accessed Jun. 21, 2004.

* cited by examiner

SYSTEM, METHOD AND COMPUTER PROGRAM PRODUCT FOR DOCUMENTING AND MANAGING EXECUTION OF PROCEDURES IN A GRAPHICAL INTERFACE ENVIRONMENT

BACKGROUND OF THE INVENTION

1. Field of the Invention

The present invention relates generally to documenting procedures, and more particularly to graphically documenting procedures.

2. Related Art

Conventional process documentation may be performed in a paper format. Word processing software applications may be conventionally used to document a procedure. The procedures may be generally placed in bound procedures manuals. In an exemplary, illustrative manufacturing plant floor environment, an operator may be assigned to perform a process and may refer to the procedures manual in performing a step. The operator may keep manual records, e.g., on a clipboard, of steps of a procedure that have been performed.

Control engineering has evolved over time. Conventionally, humans were the main method for controlling a system. More recently electricity has been used for control and early electrical control was based on relays. Electrical relays allow power to be switched on and off without a mechanical switch. Conventionally, relays may be used to make simple logical control decisions. The development of low cost computers has brought the most recent revolution, the programmable logic controller (PLC). The advent of the PLC began in the 1970s, and has become the most popular conventional manufacturing control. PLCs have gained popularity on factory floors and are expected to remain predominant for some time to come. The popularity of PLCs may be attributed to the advantages that PLCs offer over conventional control systems. PLCs are cost effective for controlling complex systems. PLCs are flexible and can be reapplied to control other systems quickly and easily. Computational abilities of PLCs allow more sophisticated control than conventionally available solutions. Troubleshooting aids coupled to PLCs make programming easier and reduce downtime. Also, reliable components make PLCs likely to operate for years before failure.

A distributed control unit may direct the operation of a process or of part of a process. A distributed control unit may be, for example, a PLC. A distributed control unit may be coupled to another computing device. For example, a distributed control unit may be coupled to a general purpose computer such as a personal computer, a mainframe computer, or a server. The general purpose computer may, for example, facilitate the programming of a distributed control unit, for example, a PLC, by a user, the presentation of data to a user, the manipulation of data provided by a distributed control unit by a range of software, the transformation of data from a distributed control unit to a range of data formats, and the transfer of data from a distributed control unit to remote locations. In a type of distributed computing scheme, several distributed control units, for example, PLCs, may be coupled to a single general purpose computer. Such a distributed computing scheme may facilitate the upgrading of an already existing control structure, the fast, local control of a process, or the design of fail-safe systems. Several general purpose computers may be coupled to one or more distributed control units allowing, for example, for the programming of and monitoring of data generated by a distributed control unit at several different locations.

Software may be used in directing a sequential process. Sequential manufacturing processes may include, for example, a machine tool process or a pharmaceutical or drug manufacturing process. INBATCH™ available from InSource Software Solutions of Richmond, Va. U.S.A. and RSBizWare Batch available from Rockwell Software Inc. of Milwaukee, Wis. U.S.A. are examples of software for directing a sequential process. Manual or automatic execution of a process may be directed by software. Manual execution of a process may be more economical and appropriate if a process is small in scale or requires application of an operator's judgment, for example, in the execution of a process under development. Automatic execution of a process may be practical if it is a high-throughput or well-understood process so that conditions and responses may be anticipated.

Software for the facilitation of the development of systems and products exists. For example, MOIS from Rhea System S.A., of Louvain-La-Neuve, Belgium is intended for preparation of satellite and space probe missions.

Documentation of a process or procedure may be required when one develops a process, or when ensuring uniform performance of a documented procedure. Conventionally, procedure documentation has been a largely manual process. For example, conventionally, bound procedures manuals have been used to document a procedure and its steps. In order to monitor process development, performance of a procedure may be documented. Documentation of use of a process may also be required to be filed with a regulatory agency. For example, the U.S. Food and Drug Administration requires the filing of papers documenting pharmaceutical or drug manufacturing processes. IBATCH® and PROFICY™ available from GE Fanuc International, Inc. of Foxborough, Mass. U.S.A. maybe used to perform some of these functions.

Conventional software and systems for documenting processes may be limited in the length of text that may be entered by a process designer in order to guide an operator. The operator may receive a short text string, for example, a short code or a reference to a manual, so that the operator must then spend time to look up the action or instruction associated with the code or reference in a bound paper procedures manual. Conventional software and systems are limited in length of text strings that an operator can enter in order to update or comment on information directing a process. Thus, conventionally, an operator must maintain a separate manual log book.

SUMMARY OF THE INVENTION

Various exemplary embodiments of a system, method and computer program product for managing a procedure are set forth in detail below.

In an exemplary embodiment, a computer-implemented method for managing a process may include receiving input of visual operation information in a graphical visual procedure interface format, and receiving a free form text description. The visual operation information from the graphical visual procedure interface format and the free form text description may be converted to a data container language. The free form text description may be of any length. The free form text description may include a verb description and an object description. For example, the verb description may be selected from a list of sample verb descriptions or the verb description may be entered by a user. For example, the object description may be selected from a list of sample object descriptions or the object description may be entered by a user.

The computer-implemented method may, in an exemplary embodiment, include receiving one or more of a data validation range, an authentication request, a function call request, or other step parameters about the visual operation information.

An exemplary embodiment of the method may include providing a document file from the data container language. Visual operation information may include a multi-section procedure.

Step-by-step interactive usage of the process may be displayed. In one exemplary embodiment, the step-by-step interactive usage may be displayed in real time. The step-by-step interactive usage may be monitored, including providing a document file from said data container language. Such monitoring may include recording progress of the process. Recording of the process may include recording one or more of the following in the document file: a manually executed sequential step or manually executed sequential steps, an automatically executed sequential step or automatically executed sequential steps, timing of completion of a sequential step, values from the user, comments from the user, results, or authentication.

In an exemplary embodiment, the method may include prompting a current sequential step of the process to a user, and receiving a response from the user. Prompting a current sequential step can include prompting one or more of the following: one or more sequential procedures; a graphical symbol to indicate progress of usage of the process; one or more colors or a shading, to indicate progress of the process; by displaying an expandable/collapsible hierarchical tree; the user for a value; an authentication by at least one of an operator, an engineer, a supervisor, a peer reviewer, an independent reviewer, or a quality assurance reviewer; a validation of the value according to a range, a step execution request; or a function call request. Receiving a response from the user can include in an exemplary embodiment, receiving one or more of the following: a selection of at least one sequential procedure; a response indicating completion of the current sequential step; a response indicating skipping the current sequential step; a response requiring automatic execution of the current sequential step or the current sequential step with a set of steps; a value; a response including a comment; a function call request; a request to execute a shell command; or an authentication from one or more of an operator, an engineer, a supervisor, a peer reviewer, an independent reviewer, or a quality assurance reviewer.

In an exemplary embodiment, the method may include converting the data container language to a computer function language. An alarm response routine may be included in visual operation information, and an alarm response routine in a computer function language format may cause interactive display of a step or steps of a procedure in the process in response to an alarm condition. A monitor function and a monitor response routine may be included with visual operation information. The monitor function in a computer function language format may initiate automatic execution of a step or steps of the monitor response routine in response to a condition.

The computer function language may be provided to an interpreter, and the process may be executed with the interpreter. A status of execution may be outputted from the interpreter, and the status of execution may be converted to a document in an alterable format. An image document in a substantially unalterable format may be generated from the document in an alterable format. The computer function language may include NOVATEH™ D/3 ® Distributed Control System Proprietary Sequence and Batch Language (SABL®) and/or an OPC-compliant language. The computer function language may include information for programming one or more real-time feedback control units that use information of the physical state of a chemical or material which the process transforms. The computer function language may include information for programming at least two distributed control units.

In an exemplary embodiment, the method may include displaying information from the data container language in a procedure overview display. The operator may update the data container language, and a document file may be provided from the updated data container language. Updating may include, for example, including values representative of the operation of a process. An image document in a substantially unalterable format may be generated from the updated data container language. The updated data container language may be electronically filed with a regulatory organization, with the updated data container language in an XML or SGML format. The regulatory organization may be, for example, the U.S. Food and Drug Administration or the U.S. Department of Energy, or any other government, regulatory, standards, certification, or other agency body or organization.

In an exemplary embodiment, the method may include generating an image document in a substantially unalterable format from the data container language. A document in an alterable format may be generated from the data container language and an image document in a substantially unalterable format may be generated from the document in an alterable format. The substantially unalterable format may include, e.g., a PORTABLE DOCUMENT FORMAT (PDF) format. The image document may be time stamped, in an exemplary embodiment. The substantially unalterable format may include a format accepted by a regulatory organization. A regulatory organization may include at least one of the following: a governmental agency, such as U.S. Food and Drug Administration (FDA), U.S. Nuclear Regulatory Commission (NRC), U.S. Department of Agriculture (USDA), U.S. Department of Energy (DOE), U.S. Department of Defense (DOD), or U.S. Department of Health and Human Services (DHHS); a private certification organization, such as UNDERWRITERS LABORATORIES INC.® (UL); or a certification, or quasi-governmental organization, such as, e.g., but not limited to, International Organization for Standardization (ISO), etc..

In an exemplary embodiment, a document in an alterable format may be generated from the data container language. The data container language may include XML. The graphical visual procedure interface format may include a MICROSOFT® VISIO®-compatible extended graphical application. The process may include at least one of the following: a chemical process, a material handling process, a drug manufacturing process, a health services process, an emergency response process, a military operation, a military service process, an electrical generation process, or an electrical distribution process. The process may include a real process or a simulated process.

In another exemplary embodiment, the method may include receiving at least a portion of the visual operation information from a visual operation information library, and/or storing at least a portion of the visual operation information in the visual operation information library. The method may include mapping a procedural description to generate visual operation information.

Further features and advantages of the invention, as well as the structure and operation of various embodiments of the invention, are described in detail below with reference to the accompanying drawings.

BRIEF DESCRIPTION OF THE DRAWINGS

In the following drawings, like reference numerals generally indicate identical, functionally similar, and/or structurally similar elements. The left most digits in the corresponding reference numeral indicate the drawing in which an element first appears.

DETAILED DESCRIPTION OF EXEMPLARY EMBODIMENTS OF THE PRESENT INVENTION

A preferred and other exemplary embodiments of the invention are discussed in detail below. While specific exemplary embodiments are discussed, it should be understood that this is done for illustration purposes only. A person skilled in the relevant art will recognize that other components and configurations can be used without parting from the spirit and scope of the invention.

An exemplary embodiment of the present invention may include a system, method, and computer program product that may allow a user to enter a description of a process visually, as visual operation information, and as free form text. The system, method, and computer program product may convert the visual operation information and the free form text description to an intermediate format, such as, e.g., but not limited to, a data container language. The system, method, and computer program product may direct manual or display/monitor automatic execution of the described process, and may interactively display the usage of the process to a user in real time. A document file in an alterable or an unalterable format representing the initial visual description of the process, the process as executed, or the process as executed with values and comments entered by the user may be generated in one exemplary embodiment. The document file may be, in an exemplary embodiment, in a format that may be filed with a regulatory organization; for example, the document file may be in a format that may be electronically filed with a regulatory organization.

Figure 1A:
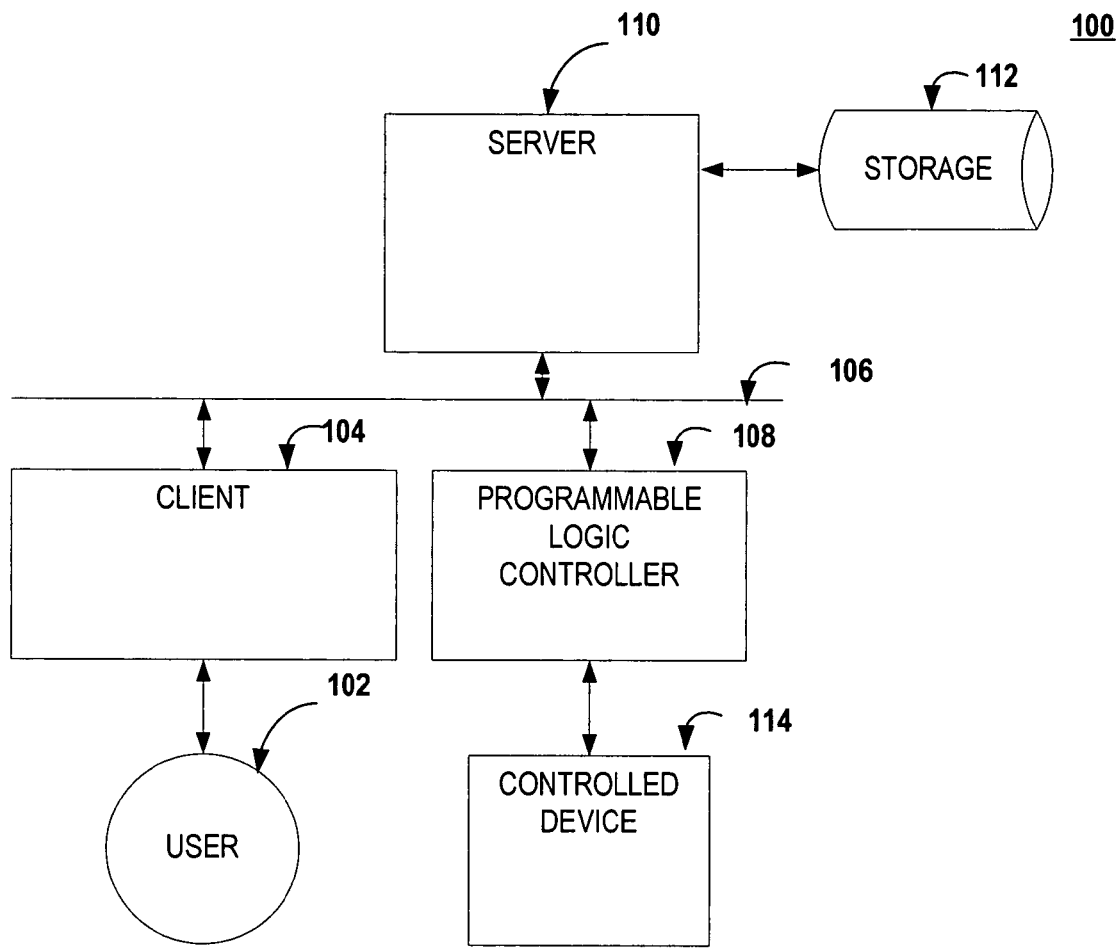
FIG. 1A depicts an exemplary embodiment of a system environment for managing a procedure according to an exemplary embodiment of the present invention.

FIG. 1A depicts an exemplary embodiment of a diagram 100 illustrating an exemplary system for managing a procedure that may include a client 104 that may be used by a user 102 to document a procedure according to an exemplary embodiment of the present invention. Client 104 may be a standalone computing device in one exemplary embodiment. In another exemplary embodiment, client 104 may be coupled as shown to other devices to achieve a system. Client 104 in an exemplary embodiment may be a computer such as illustrated and described further below with reference to FIG. 4. As shown in FIG. 1A, client 104, in another exemplary embodiment, may also be a component of a network system. In one exemplary embodiment, client 104 may be part of a client-server system. Diagram 100 illustrates client 104 coupled to another device, such as, e.g., server 110. In an exemplary embodiment, client 104 may be coupled over a network 106 which may include one or more communication links and associated network hardware. For example, network 106 may include an exemplary wireless or wired network communication link. Server 110 may in an exemplary embodiment be used by client 104 to access resources of server 110 such as, e.g., a storage device 112. Server 110 may be a general purpose computing device as described further below with reference to FIG. 4. In an exemplary embodiment, the client 104 may be further coupled as shown in diagram 100 to another device such as, e.g., but not limited to, a programmable logic controller (PLC) 108. The PLC 108, in an exemplary embodiment, may be used to control another controllable device such as, e.g., but not limited to, controlled device 114. In an exemplary embodiment, the client 104 may communicate with other networked devices such as, e.g., but not limited to, server 110, and/or PLC 108 using any of a number of well known communication protocols, networks and related technologies such as, e.g., but not limited to, a local area network (LAN), a wide area network (WAN), a wired network, or a wireless network. Although client 104, server 110, and PLC 108 may be described herein as coupled to one another, the devices 104, 108, and 110 need not be directly connected to one another, and may instead by coupled by any of various conventional physical or logical, network technologies such as, e.g., but not limited to, routers, bridges, gateways, transceivers, antennae and cables.

The client 104 may be a communications device or computing device such as, e.g., but not limited to, a tablet, handheld, subnotebook, notebook, laptop, desktop or work station computer such as, e.g., a personal computer (PC), a personal digital assistant (PDA), or other device.

Figure 1B:
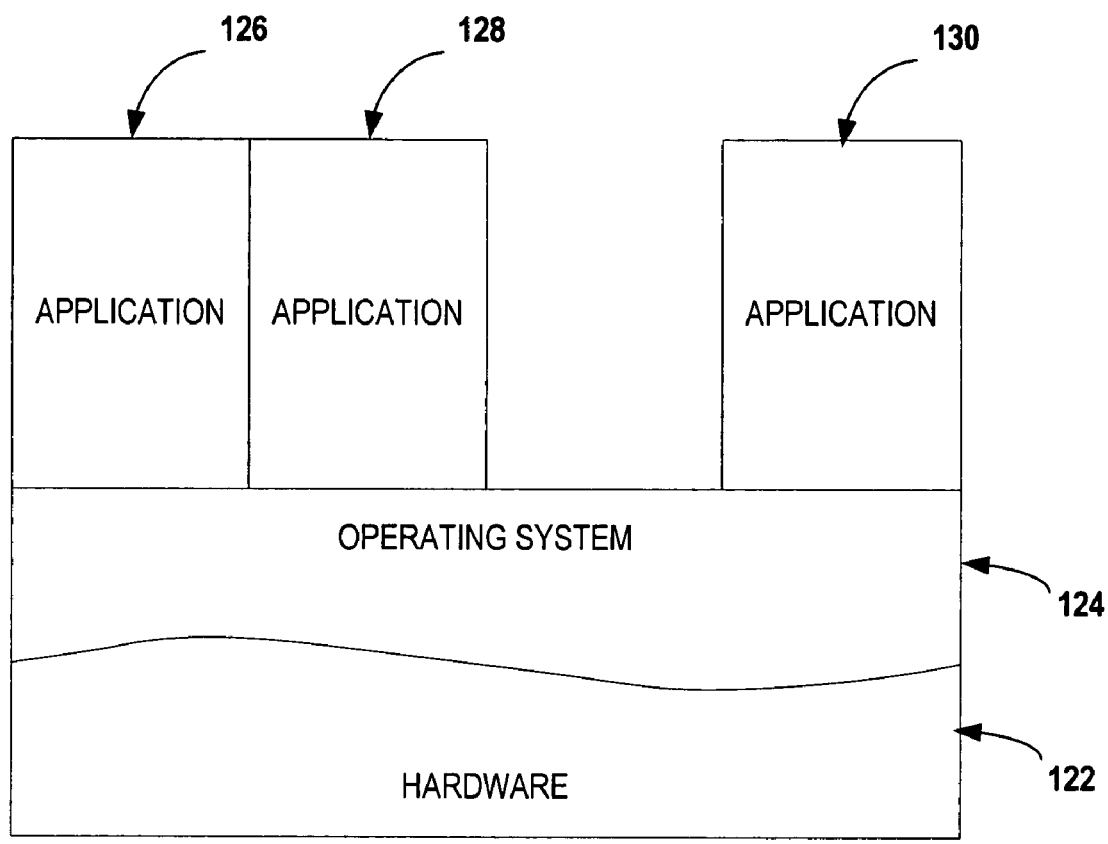
FIG. 1B depicts an exemplary embodiment of a software application architecture environment according to an exemplary embodiment of the present invention.

FIG. 1B depicts an exemplary embodiment of a software application architecture environment 120 according to an exemplary embodiment of the present invention. Exemplary software architecture environment 120 as illustrated may include, e.g., but is not limited to, a hardware platform 122 upon which may execute an operating system 124. Operating system 124 may provide a standard software interface including, e.g., but not limited to, a graphical user interface (GUI) through which the user 102 may interact with the operating system 124 and/or one or more software application programs 126, 128, and 130 as illustrated. It would be apparent to a person having skill in the art that environment 120 could also depict, e.g., but not limited to, client 104, server 110, and PLC 108. Operating system 124 may provide a uniform interface of application programming interfaces (APIs) to applications 126, 128 and 130 for access to hardware 122. An exemplary application 126 may include a graphical drawing application program such as, e.g., but not limited to, VISION® available from MICROSOFT CORPORATION of Redmond, Wash., U.S.A.

Figure 2:
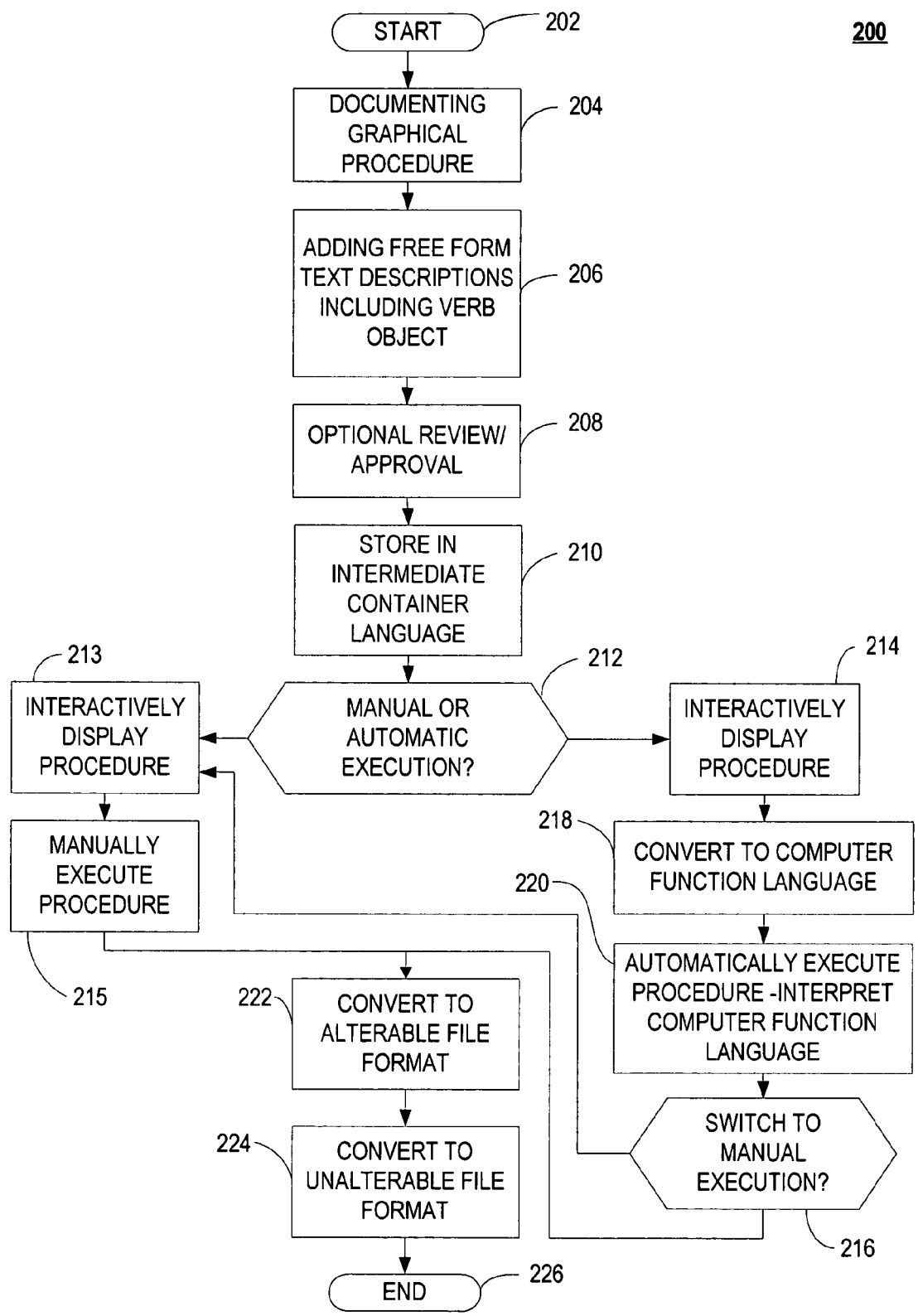
FIG. 2 depicts an exemplary embodiment of a flow diagram illustrating an exemplary process of documenting and managing a procedure that may include manual or automatic execution, interactive display, and storage in alterable and/or unalterable format of a procedure execution according to an exemplary embodiment of the present invention.

FIG. 2 depicts an exemplary embodiment of a flow diagram 200 illustrating an exemplary method of managing a process according to an exemplary embodiment of the present invention. Processes that can be managed include, for example, but not limited to, a chemical process, a material handling process, a drug manufacturing process, a health services process, an emergency response process, a military operation, a military service process, an electrical generation process and/or an electrical distribution process, etc. The process may include, e.g., a real process, for example, a process in a manufacturing plant, or a simulated process, etc. A simulated process may be developed to mimic an actual process and allow, for example, a user such as an operator to be trained without risk of damage to equipment or harm to personnel. A simulated process may range from simple to complex; for example, a simple simulated process may allow a user to step through individual steps of a process with no resultant action, and a complex simulated process may allow a user to advance to a step, provide the user with a simulated malfunction, and allow the user to enter a response to the simulated malfunction. In an exemplary embodiment, the user 102 may use the system to document a procedure for managing a process using an interactive graphical user interface (GUI) as illustrated and discussed further below with reference to FIGS. 3A and 3B. Once a procedure is documented, in an exemplary embodiment, the procedure may be executed in a manual environment with an operator manually stepping through the procedure, or automatically while allowing the user 102 to track the status of execution. Execution of the procedure may in an exemplary embodiment be viewed using an interactive display, by user 102. The execution of the procedure may be logged and stored in an alterable file format and/or an unalterable format which may in an exemplary embodiment include timestamps of when steps of a procedure are performed, tracking of authentications of steps requiring such, as well as operator comments from user 102.

An advantage of a system, method, and computer program product according to the present invention is that the tools for designing a procedure can be used by technicians or office workers having a minimum of engineering or scientific training. With a system, method, and computer program product according to the present invention, an engineer can provide a description of a procedure to a technician or office worker who then can use a graphical interface to enter the described procedure into a system, so that the procedure can be automatically or manually executed. The procedure can be documented and presented so that an operator with a minimum of technical or scientific training can easily and accurately follow instructions for carrying out a manual procedure.

Flow diagram 200 of FIG. 2 in an exemplary embodiment may begin with 202 and may continue immediately with 204.

In 204, in an exemplary embodiment, user 102 using a graphical interface may document graphically visual operation information, e.g., a procedure chart using an interactive graphical user interface tool similar to that shown and described further below with reference to FIG. 3B using such software components as illustrated and discussed further below with reference to FIG. 3A. A graphical visual procedure interface format for documenting graphically visual operation information may include, for example, a format of a MICROSOFT® VISIO®-compatible extended graphical application. In an exemplary embodiment, the graphical system may be an extension of VISIO® referred to as PAPERLESS PROCEDURES, available from NovaTech Process Solutions, LLC of Columbia, Md. U.S.A. For example, the graphical system may be an "add-in" module, for example, the "add-in" module may interact with another program, such as VISIO®. The rules and an array of tools for documenting graphically visual operation information may be included in the "add-in" module. These rules may, for example, govern how a textual description is related to graphic representation of operation information or how a graphically represented procedure and associated textual information may be placed in an intermediate format such as a data container language. For example, the rules may govern how data is placed into a data container language format. VISIO® may, for example, serve to support the drawing of graphic representations of a procedure. In an exemplary embodiment, at least a portion of the visual operation information may be received from a visual operation information library. In another exemplary embodiment, at least a portion of the visual operation information may be stored in a visual operation information library. An advantage of a graphical interface can be that a designer is forced to form logical connections of actions and decisions, so that the procedure does not have dead ends and incorrect logic. From 204, flow diagram 200 may continue with 206.

In 206, in an exemplary embodiment, user 102 may advantageously add one or more textual descriptions of the procedure using a free form text description. In an exemplary embodiment, the free form text description may be long, for example, up to a pre-defined length. A pre-defined length may be, for example, 32,767 characters. The free form text description may include special characters, such as international characters, characters from non-Latin alphabets, e.g., Greek, as well as the Latin alphabet, and mathematical and other symbols. The free form text description may include, in an exemplary embodiment, formatting such as, e.g., but not limited to, underlining, bolding, italicizing, and paragraphing with a line return and indenting. The free form text description may include a verb description and an object description. For example, a verb description may be selected from a list of sample verb descriptions, or a verb description not in the list of sample verb descriptions may be entered by a user. For example, an object description may be selected from a list of sample object descriptions, or an object description not in the list of sample object descriptions may be entered by a user. In an exemplary embodiment, the description may include an association of the combination of the verb description and the object description with a computer function language for possible use in later automated execution. User 102 may also add additional information, i.e., additional step parameters, about the visual operation information. For example, user 102 may add a data validation range, which, for example, includes bounds on a value an operator can enter for the value to be accepted. User 102 may add an authentication request, which requires an authorized person, for example, but not limited to, an operator, a supervisor, an engineer, a process designer, or other personnel directly or indirectly involved with the design or execution of the process, to electronically or otherwise sign off on a step. User 102 may add a shell command; a shell command may cause, for example, an internet page containing product information on a component of machinery used in a process, e.g., a valve, to be displayed to an operator during execution of the process. The user may add other step parameters about the visual operation information, for example, information indicating that a specific solenoid should open a valve during a step during automatic execution of the process. From 206, flow diagram 200 may continue with 208.

In 208, in an exemplary embodiment, a documented procedure may optionally be reviewed and approved. From 208, flow diagram 200 may continue with 210.

In 210, in an exemplary embodiment, the graphically represented procedure and associated textual information may be placed in an intermediate format. In an exemplary embodiment, the procedure may be stored in a standard format that may allow ready access to the procedure. In one exemplary embodiment, the intermediate format may be a data container language. In an exemplary embodiment, the data container language may be an extensible markup language (XML) format. In another exemplary embodiment, a document file is provided from the information in data container language format. For example, an image document in a substantially unalterable format may be generated from information in the data container language format. Alternatively, a document in an alterable format may be generated from information in the data container language format. In an exemplary embodiment, a document in an alterable format may be generated from information in the data container language format and an image document in a substantially unalterable format may be generated from the document in an alterable format. An image document may be time stamped. An example of a substantially unalterable format is the PORTABLE DOCUMENT FORMAT (PDF). The substantially unalterable format may include a format accepted by a regulatory organization. From 210, flow diagram 200 may continue with 212.

In 212, in an exemplary embodiment, the system may be configured for manual or automatic execution. From 212, flow diagram 200 may continue with 213 if the system has been configured for manual execution of the procedure, or may continue with 214 if the system has been configured for automatic execution of the procedure.

In 213, in an exemplary embodiment, the procedure as documented may be displayed for execution in manual mode. In one exemplary embodiment, the procedure may be depicted as an expandable/collapsible hierarchical tree based procedure for showing steps and substeps of the procedure. In another exemplary embodiment the display may indicate the status of a step being performed using, e.g., a graphical icon, a color or a shading to indicate the level of completion of a step and the progress of the process. In an exemplary embodiment, the step-by-step interactive usage of the process may be interactively monitored. The procedure may be interactively accessed allowing, for example, an operator to step through the procedure as the operator manually executes the process. The display may prompt a user for a value, and validate that the value lies within a range. The display may prompt a user to indicate whether a shell command, e.g., for displaying an internet page, should be executed. From 213, flow diagram 200 may continue with 215.

In 215, in an exemplary embodiment, an operator user 102 may manually step through the steps of the procedure. An operator user 102 may indicate completion of a current step or may indicate that a current step is being jumped to another step.

For a manual procedure, a designer may designate one action shape, representing an action step, or two or more action shapes in a series, representing a series of action steps, as expert mode. An action step may be presented to an operator to instruct the operator perform a task. For example, an action step may be presented in a hierarchical tree shown in an execution window of a procedure overview display. Action steps designated as expert mode may be skipped, for example, not presented to an operator, when the procedure is run in expert mode. For example, when one or more action steps are presented in a hierarchical tree, the tree may indicate that an action step is to be performed. An operator may indicate that an action step has been performed, so that the next step in a sequence of steps is indicated. If the next step is or steps are designated as expert mode, and the procedure is run in expert mode, these steps may be skipped and not presented, so that the next non-action step or action step not designated as expert mode in the sequence may be presented to the operator. Use of an expert mode designation for an action step or action steps may be useful, for example, when detailed instructions must be provided for less experienced operators, but experienced operators do not need such detailed instructions. For an inexperienced operator, the procedure may be run not in expert mode, so that the inexperienced operator is presented with and must confirm completion of each detailed step. For an experienced operator, the procedure may be run in expert mode, so that detailed steps designated as expert mode are not presented, and only an action step describing an overall task is presented; the experienced operator, familiar with the detailed steps for performing the overall task, may simply confirm completion of the overall task.

In an exemplary embodiment, the operator may add comments. The comments may be text of any length, up to a flexibly architected limit, for example, a flexibly architected limit of 32,767 characters. In another exemplary embodiment, the user may be required to authenticate using a user name and password or user name and password entry by a supervisor of input that a step was approved to perform. From 215, flow diagram 200 may continue with 222.

In 214, in an exemplary embodiment, the procedure as documented may be displayed for execution in automatic mode. In one exemplary embodiment, the procedure may be depicted as an expandable/collapsible hierarchical tree based procedure for showing steps and substeps of the procedure. In another exemplary embodiment the display may indicate the status of a step being performed using, e.g., a graphical icon, a color or a shading to indicate the level of completion of a step and the progress of the process. In an exemplary embodiment, the step-by-step interactive usage of the process may be interactively monitored. The procedure may be interactively accessed allowing, for example, an operator to monitor status of automated execution of the procedure. The display may prompt a user to indicate whether a shell command, e.g., for displaying an internet page, should be executed. From 214, flow diagram 200 may continue with 218.

In 218, in an exemplary embodiment, the steps of the procedure may be converted into a computer function language format. The computer function language maybe, for example, NOVATECH™ D/3® Distributed Control System Proprietary Sequence and Batch Language (SABL®) or an OPC-compliant language. From 218, flow diagram 200 may continue with 220.

In 220, in an exemplary embodiment, the steps of the procedure in computer function language format may be sent to an interpreter to automatically execute the procedure. The interpreter programmed with the steps of the procedure may be a distributed control unit, for example, a real-time feedback control unit which uses information of the physical state of a chemical or material which the process transforms. Such a feedback control unit may use, for example, a measured temperature of a chemical to set an appropriate voltage across a heating coil. The steps of the procedure in computer function language format may be sent to two or more interpreters, for example, two or more distributed control units may be programmed. From 220, flow diagram 200 may continue with 216.

In 216, in an exemplary embodiment, an operator may be prompted to indicate whether execution should be continued in automatic mode or whether execution should instead be continued in manual mode. From 216, flow diagram 200 may continue with 213 if the operator has indicated that execution should be continued in manual mode. If the operator has indicated that execution should be continued in automatic mode, automatic execution may continue, or, when the procedure has been completed, flow diagram 200 may continue with 222.

In an exemplary embodiment, the status of a manually or automatically executed procedure, including, for example, the steps executed and results of a step, is stored in a standard format such as a data container language. The timing of completion of a step and an authentication may be stored in a data container language. The operator may update a procedure stored in a data container language by, for example, entering a value to represent the result of a step; for example, the operator may indicate whether the appearance of a mixture is smooth or granular. Automatically obtained information from a process, such as temperature data from a thermocouple, may be stored in a data container language to represent the result of a step.

An updated procedure stored in a data container language format may be filed with a regulatory organization. The data container language may be, for example, XML or SGML. Examples of regulatory organizations may include governmental agencies such as the U.S. Food and Drug Administration (FDA), the U.S. Department of Energy (DOE), the U.S. Nuclear Regulatory Commission (NRC), the U.S. Department of Agriculture (USDA), the U.S. Department of Defense (DOD), or the U.S. Department of Health and Human Services (DHHS). Regulatory organizations may also include private certification organizations, for example, UNDERWRITERS LABORATORIES INC.® (UL), and quasi-governmental organizations, for example, International Organization for Standardization (ISO).

An example of an alterable electronic format is standard generalized mark-up language (SGML) or an SGML-derived format such as XML.

Extensible markup language (XML) is a meta-language, not a single, predefined markup language. XML allows one to design one's own markup. XML is used to describe the structure of data, so anywhere that data is input, output, stored, or transmitted from one place to another, may benefit from the application of XML. XML is a specification developed by the W3C consortium. XML is a pared-down version of SGML. XML is designed especially for Web documents. XML allows designers to create their own customized tags, enabling definitions, transmission, validation, and interpretation of data between applications and between organizations.

In 222, in an exemplary embodiment, status of execution of the procedure may be outputted and converted into an alterable file format such as a wordprocessing application format. From 222, flow diagram 200 may continue with 224.

In 224, in an exemplary embodiment, the status of execution of the procedure may be converted into a substantially unalterable format such as, for example, but not limited to, PORTABLE DOCUMENT FORMAT (PDF). From 224, flow diagram 200 may continue with 226.

Conversion of the status of execution procedure into an alterable file format or into an unalterable format, such as an unalterable image file, may be considered recording of progress of the process in a document file. For example, a manually executed step or steps or an automatically executed step or steps may be recorded in a document file. The timing of completion of a step, values or comments entered by a user, or authentications may be recorded in a document file. The results of a step may be recorded in a document file; for example, a user entered value representing an aspect of the state of a process after a step, e.g., a texture of a mixture, or an automatically measured value, e.g., a temperature measured by a thermocouple, may be recorded in a document file. Updates to a procedure may be converted to a document file.

A procedural description may include information in a data container language format and may include a document file, for example, a document in an alterable format or a document in a substantially unalterable format. A procedural description may be mapped to generate visual operation information, for example, for the design of a new process or modification of the current process. For example, but not limited to, a designer may map by reviewing a procedural description, selecting a graphical building component in a graphical interface format, copying appropriate text from the procedural description, pasting the text into the graphical building component, placing the graphical building component within a graphic user interface, and repeating to generate the desired visual operation information.

In 226, in an exemplary embodiment, flow diagram 200 may end.

In an exemplary embodiment, a user may develop an Alarm Response Routine, for example, by using a graphical interface. An Alarm Response Routine may be triggered in response to a user assigned alarm condition. An Alarm Response Routine may interact with a computer function language, for example, NOVATECH™ D/3® Distributed Control System Proprietary Sequence and Batch Language (SABL®) and/or an OPC-compliant language, that may direct a processor in monitoring sensors for alarm conditions. For example, a part or a whole of an Alarm Response Routine can be in the format of computer function language. In an embodiment, the steps represented in an Alarm Response Routine may be carried out by an operator. For example, once an Alarm Response Routine has been triggered, it may interactively display or cause interactive display of a step or steps of a manual procedure to an operator. Thus, for example, an Alarm Response Routine can monitor a process for an emergency condition, and efficiently guide an operator in responding to the emergency condition.

In an exemplary embodiment, a user may define a Monitor function and include this function in a procedure; a user may develop a Monitor Response Routine. For example, a user may include a Monitor function and/or a Monitor Response Routine with visual operation information. A Monitor function can monitor a process for one or more conditions and, if the condition is met, direct halting of a currently running procedure, and initiate automatic execution of a step or steps of a Monitor Response Routine. When the Monitor Response Routine has completed running, execution may continue with the procedure which the Monitor function halted. A Monitor function may be implemented, for example, through a computer function language such as NOVATECH™ D/3® Distributed Control System Proprietary Sequence and Batch Language (SABL®) and/or an OPC-compliant language. For example, computer function language instructions may direct a processor to monitor analog values, for example, analog values provided by sensors, digital states within the processor or in another processor, or alarm conditions recognized by the processor or outside of the processor. A graphical user interface (GUI) environment may include a separate canvas dedicated to the design of Monitor Response Routines; for example, a separate page in a MICROSOFT® VISIO® —compatible extended graphical application may be dedicated to the design of Monitor Response Routines.

Figure 3A:
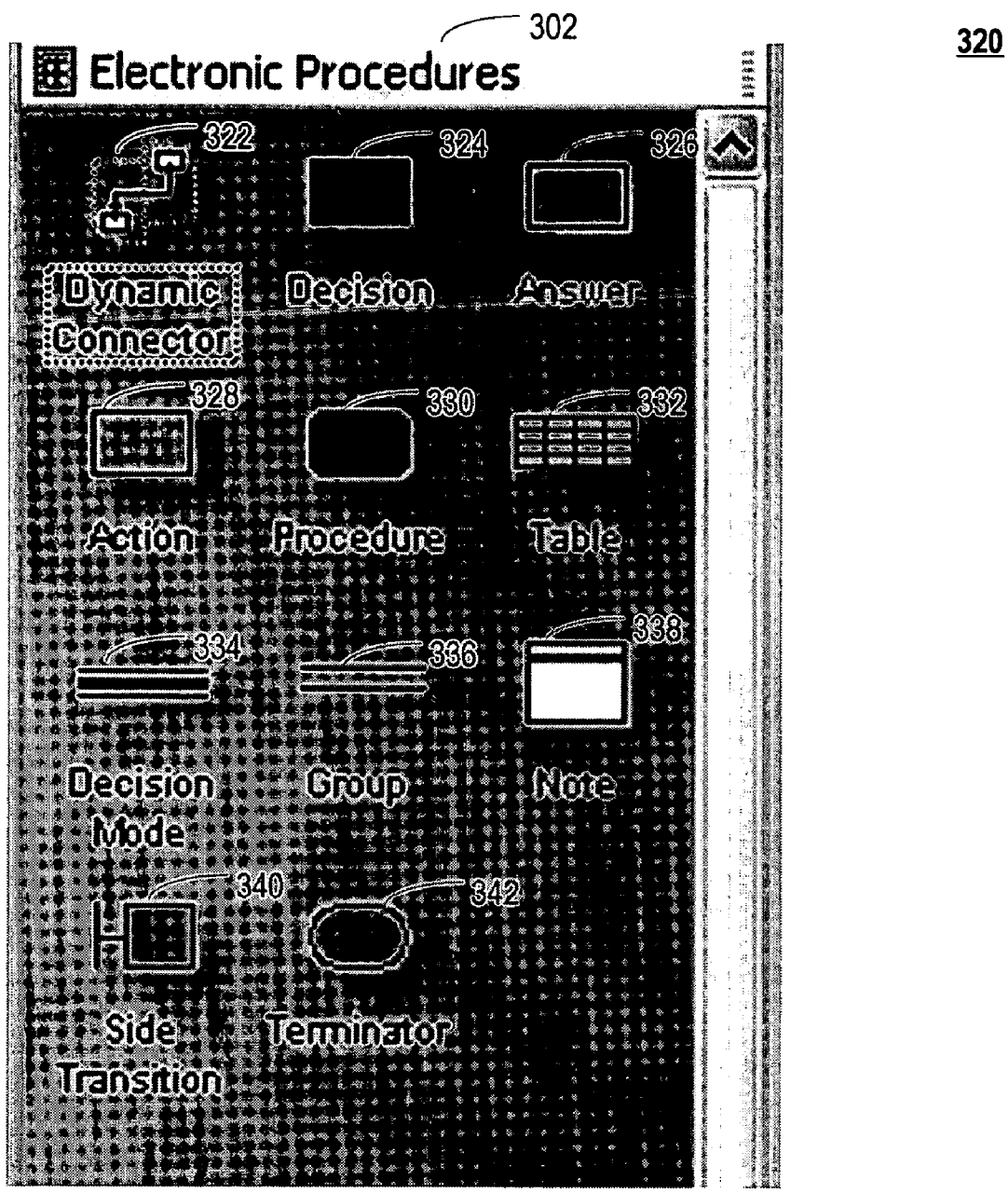
FIG. 3A depicts an exemplary embodiment of a screenshot of an exemplary set of graphical building components that may be used in an exemplary GUI environment including a system for documenting a procedure graphically according to an exemplary embodiment of the present invention.

FIG. 3A depicts an exemplary embodiment of a screenshot 320 of an exemplary set of graphical building components displayed in an exemplary window 302 that may be used in an exemplary GUI environment including a system for documenting a procedure graphically according to an exemplary embodiment of the present invention.

One graphical building component, in an exemplary embodiment, which may be termed a dynamic connector 322, in an exemplary embodiment, may be used to link together any two graphical building components. The execution or performance of a graphical building component to which the end of the dynamic connector 322 with no arrow may be linked may precede the execution or performance of a graphical building component to which the end of the dynamic connector 322 with an arrow may be linked.

A decision box 324 may, in an exemplary embodiment, indicate a determination, or prompting for decision information from an operator or from a device, such as, e.g., but not limited to, a PLC. Information prompted for may include, for example, a value.

A decision mode bar 334 may, in an exemplary embodiment, follow a decision box, and indicate that one or more of several actions may follow from a value received in response to a prompt from a decision box 324.

An answer box 326, in an exemplary embodiment, may indicate that if, in response to a prompting for information, a value is received that is equivalent to the value in the answer box, then the action specified in a subsequent action box 328 may be performed. Another decision mode bar 334 and a terminator box 342 may, for example, follow an action box and may, in an exemplary embodiment, indicate that a response to the prompting indicated by a decision box 324 has been received and appropriate action taken.

A note box 338, in an exemplary embodiment, may be inserted into a representation of a procedure in a GUI environment. The note box 338 provides information to an operator in a verbose form.

A table box 332, in an exemplary embodiment, may be inserted into a representation of a procedure in a GUI environment to allow the designer to enter information directing one or more steps, for example, verb descriptions and object descriptions, in a tabular format. A table box 332 may be inserted into a representation of a manual procedure or may be inserted into a representation of an automatic procedure; for example, a table box 332 may include information directing a process during automatic execution. A table box 332 may cause a matrix to be presented to an operator, for example, to be displayed to an operator in a procedure overview display. A designer may designate a column or columns in the matrix for one or more classes of information, for example, for a verb description or an object description. Each row of the matrix may represent, for example, an action step. When a step represented in the matrix is manually completed, an operator may so indicate; a symbol next to a row may change, for example, may change color or shading, to indicate that the step represented by the row has been completed. When a step represented in the matrix is automatically completed, a symbol next to a row may change, for example, may change color or shading, to indicate that the step represented by the row has been completed. The table box may be represented in, for example, an approved PDF file or in an executed PDF file, as a matrix.

The group bar 336, in an exemplary embodiment, may be inserted to indicate that execution of several procedural chains follows; the leftmost procedural chain is executed first, then each successive procedural chain to the right is executed. Another group bar 336 following these procedural chains, in an exemplary embodiment, terminates the execution grouping. The side transition box 340 determines whether a specified condition exists, and based on whether or not the condition exists, transfers execution to another procedural chain or allows execution to continue along the current procedural chain.

In an embodiment, a user may design a multi-section procedure and graphically document the multi-section procedure as visual operation information. For example, the user may insert a group bar and indicate that the group bar has the multi-select property. The user may place one or more procedural chains below the group bar, each procedural chain representing a section. Another group bar and a terminator following the procedural chains may indicate termination of the execution grouping; additional shapes in a single chain may follow this other group bar and terminator. When an operator reaches the step in the procedure indicated by the group bar with the multi-select property preceding the one or more procedural chain(s), the display may present the operator with a multi-select question, that is, with a choice of which of the one or more procedural chain(s) should be executed. The operator may select which procedural chain or chains to execute. Before a procedural chain selected for execution in response to the multi-select question is executed, the display may present the operator with a request for verification that the procedural chain is to be executed. If the operator responds that the procedural chains is to be executed, then the procedural chain is executed. If the operator responds that the procedural chain is not to be executed, then if the operator had indicated that another procedural chain is to be executed, the display may present the operator with a request for verification that the other procedural chain is to be executed. After a procedural chain has been executed, if another procedural chain had been selected for execution in response to the multi-select question, the display may present the operator with a request for verification that the other procedural chain is to be executed. After each selected procedural chain or chains has or have been executed, execution may continue with the steps indicated by the additional shapes in the single chain following the other group bar and terminator, rather than with any other procedural chain or chains between the group bar with the multi-select property and the other group bar that were not selected. In an approved PDF document, which may present the procedure, but not results of execution, the multi-select question is presented in a Preliminary Actions section of the document. In an executed PDF document, the multi-select question may be presented as in the approved PDF document; the full text of sections that were executed and sections that were skipped may be presented. However, an additional notation at the top of a skipped section may indicate that the section was skipped. An approved PDF document may, for example, be printed for use by an operator. For example, in a method, a user may direct that the approved PDF document be printed with checkboxes next to each step; an operator may use these checkboxes to indicate the completion of a step and progress of the process. Providing an operator with a printed approved PDF document may be useful, for example, when the operator is at a remote location where no computer is available.

Figure 3B:
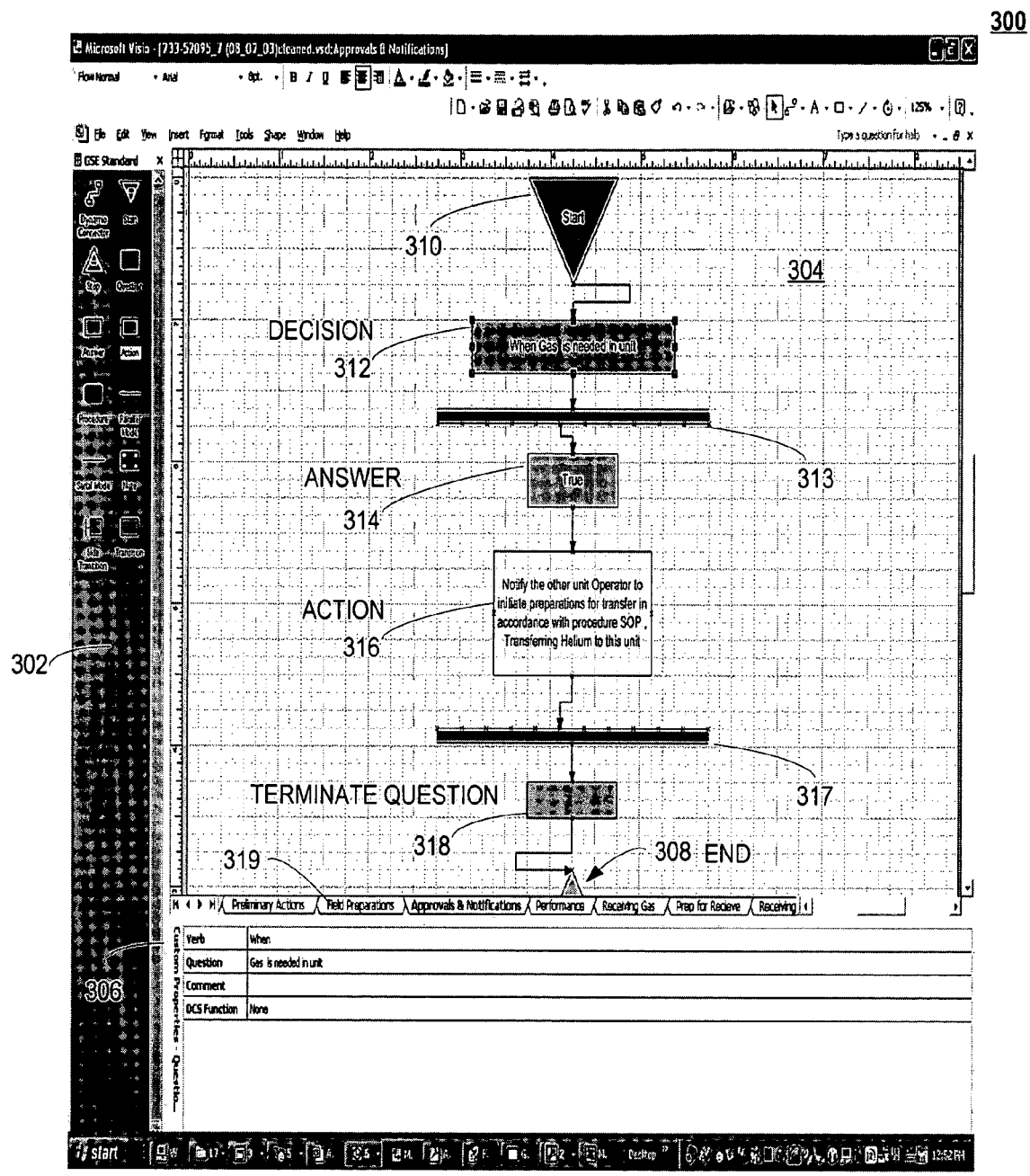
FIG. 3B depicts an exemplary embodiment of a screenshot of an exemplary graphical user interface (GUI) environment illustrating an exemplary system for documenting a procedure graphically according to an exemplary embodiment of the present invention.

FIG. 3B depicts an exemplary embodiment of a screenshot 300 of an exemplary graphical user interface (GUI) environment illustrating an exemplary application software GUI system for documenting a procedure graphically according to an exemplary embodiment of the present invention. In an exemplary embodiment, a graphical building component 310 that may indicate the start of a process and a graphical building component 308 that may indicate the end of a process may be present on the canvas 304. A process or procedure designer may, in an exemplary embodiment, add graphical building components by dragging from an object template on window 302 and dropping onto the canvas 304. A decision graphical component 312 may signify a conditional step or steps: one or more steps may be performed in the process depending on the value of data received. For example, a decision box 312, in an exemplary embodiment, may prompt an operator for a response to a question. As shown in 300, a decision box 312 that may represent a question within a procedure, may be included. The decision mode bar 313 may signify entry into a decision mode. The answer box 314 may signify the value, that if received, may trigger a subsequent action or set of actions such as, for example, but not limited to, represented by the answer box 316. A decision mode bar 317 and a terminator box 318, in an exemplary embodiment, may follow the action box 316, to indicate that appropriate action based on a response to the prompting indicated by a decision box 312 (not fully shown) has been taken and the decision mode has been exited. Also indicated in FIG. 3B at 306 are spaces for the entry of a free form text description; in the case illustrated in 300, the free form text description is associated with the decision graphical component 312. Shown in 306 are other textual components such as a verb description, a question, a comment, and a DCS function, which may be used to map a graphical procedure to an automated process step via a computer function language such as, e.g., NOVATECH™ D/3® Distributed Control System Proprietary Sequence and Batch Language (SABL®) available from NovaTech Process Solutions and/or an OPC-compliant language. As shown in diagram 300, multiple procedures may be viewed, and displayed by selection of a folder tab 319, in an exemplary embodiment.

Figure 3C:
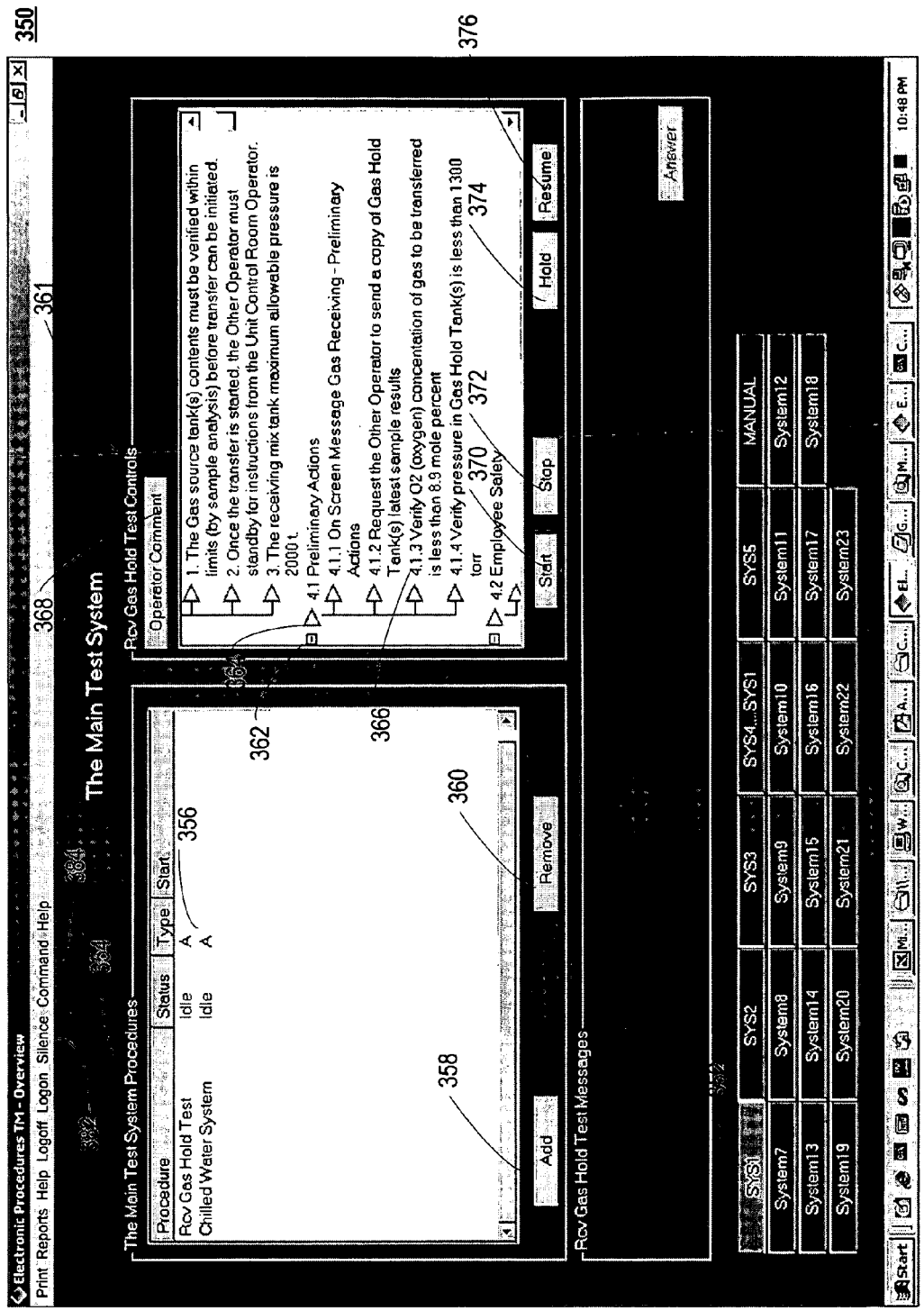
FIG. 3C depicts an exemplary embodiment of a screenshot of an exemplary interactive procedure execution display GUI environment illustrating an exemplary system for displaying, monitoring and managing execution automatically of a procedure according to an exemplary embodiment of the present invention.

FIG. 3C depicts an exemplary embodiment of a screenshot 350 of an exemplary interactive procedure overview display GUI environment illustrating an exemplary system for managing execution automatically of a procedure according to an exemplary embodiment of the present invention. In an exemplary embodiment, a user may define up to 24 systems. At the outset, a system may be selected for view by using one of the system buttons, shown as button 352. For example, as shown, SYS1 may be selected. Using the add button 358 of the multiple sequential procedure window 354, produces a pop up list of possible procedures allowed for the selected system. An operator may select one or more of the procedures for execution; examples of procedures selected for execution are shown in 356. An operator may choose one or more of the procedures 356 for execution; a procedure may be a manual procedure or an automatic procedure. More than one of the procedures 356 may be run simultaneously as a form of multi-tasking. Once a procedure has completed running or has been exited, an operator may deselect the procedure by using the remove button 360. The execution window 361, may display the steps 366 in a given procedure of the procedures 356. The steps of the procedure may, in an exemplary embodiment, be displayed in a hierarchical format. In an exemplary embodiment, as illustrated, expand/collapse buttons 362 may allow the individual steps 366 of a group of steps 364 to be displayed or hidden using an intuitive graphical user interface button which may show a "+" sign if additional steps may be shown by expanding, or a "−" sign if fully expanded and available for collapsing. An operator may start execution of a sequential procedure by pressing the start button 370 to sequentially step through the procedure, in an exemplary embodiment, and may terminate execution of a sequential procedure by pressing the stop button 372. The operator may press the hold button 374 to temporarily pause execution of an automatic sequential procedure and may press the resume button 376 to resume execution of the automatic sequential procedure. The operator may cause an automatic procedure to be executed manually. In an exemplary embodiment, an interactive procedure overview display GUI environment for managing manual execution of a procedure may include step and jump buttons instead of hold and resume buttons. The operator may press the step button to advance to the next step. The operator may press the jump button to skip either forward or backward to a step which may be other than the next step in sequence. For example, the operator may press the jump button and then click on a step represented in an execution window 361 of a procedure overview display to jump to that step. An executed PDF document can indicate who approved a jump in a manual procedure execution. A menu is displayed at the left hand side of the gray bar near to the top of the screenshot 350. When pressed, the silence button 382 may mute sounds and audio signals provided to an operator. In an embodiment, the silence button 382 may mute sounds and audio signals for a limited period of time. The command button 384 may, for example, allow an operator to direct the functioning of the procedure overview display or of the method for managing a process through buttons on a drop-down menu revealed when the Command button is pressed. For example, a drop-down menu from the Command button may include a button that when pressed switches an automatically executing procedure to manual execution. A drop-down menu from the Command button may include a button that when pressed directs an automatically executing procedure to execute in single step mode. In single step mode, after a step has been automatically or manually completed, the operator must indicate, e.g., by pressing a button, that a subsequent step should be executed. A button for switching to single step mode may also be accompanied by, for example, a button for switching from single step mode to automatic mode and a button for allowing execution of a subsequent step.

In an exemplary embodiment, a procedure overview display for an automatic procedure may include a jump button. If the jump button is pressed by an operator during execution of the automatic procedure, the display may present the operator with a list of steps to which the operator may jump. For example, the display may not present the operator with the option to jump to a step which requires the completion of another step which has not been completed, but may present the operator with the option to jump to a step which does not depend on the completion of another step or which depends on the completion of another step which has been completed.

In order to add comments to the recorded execution of a process, the operator may press the operator comment button 368. The interactive usage of the process may be displayed in real time. For example, the status of a given step may be indicated by color or shading. In an exemplary embodiment, the color and/or shading of the triangle may be indicative of the status of a step. For example, a white triangle may indicate a step that has not yet been completed, in an exemplary embodiment. In an exemplary embodiment, graying-out the triangle associated with a listed step may indicate that the step has been completed, green may indicate that the step is in process, and as previously noted, a white background may indicate that the step has not yet been reached. Further, the color and shading of the text may also be varied to indicate status of completion of a step, in an exemplary embodiment. Although not shown, in some cases a step may require an operator to complete the step, to provide an authentication such as, e.g., entry of a username and/or password. Other exemplary authentications may include, in an exemplary embodiment, an authentication by a supervisor or other user. Advantageously, if a procedure is executed automatically, a procedure overview display such as the procedure overview display of 350 may be used to monitor performance of the procedure during automated execution.

Figure 4:
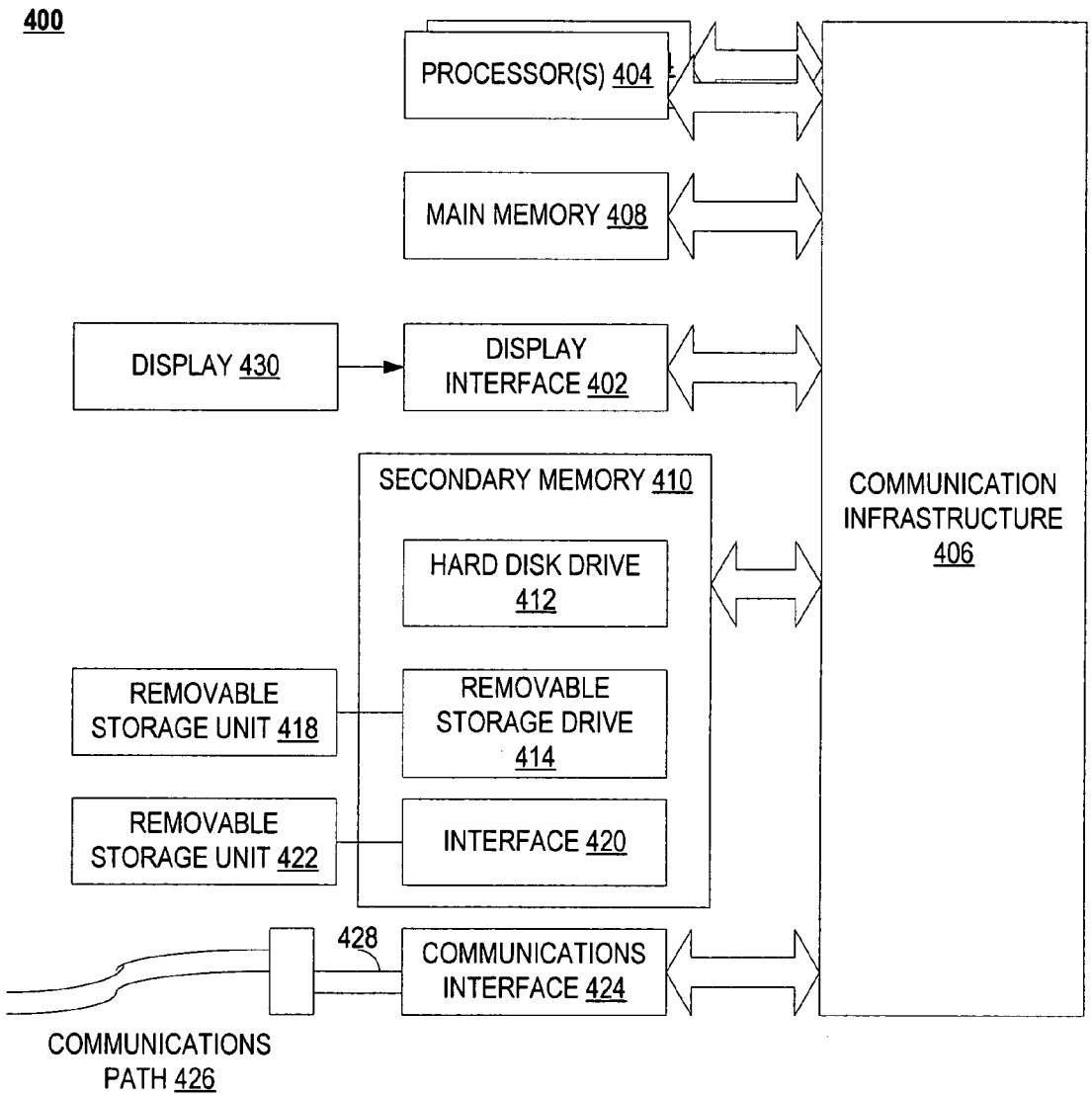
FIG. 4 depicts an exemplary embodiment of a computer system that may be used in any of the computing devices of an exemplary embodiment of the present invention.

FIG. 4 depicts an exemplary embodiment of a computer system 400 that may be used in any of the computing devices such as, e.g., but not limited to, devices 104, 108, and 110 of the exemplary embodiment of the present invention. The present invention (or any part(s) or function(s) thereof) may be implemented using hardware, software, firmware, or a combination thereof and may be implemented in one or more computer systems or other processing systems. In fact, in one exemplary embodiment, the invention may be directed toward one or more computer systems capable of carrying out the functionality described herein. An exemplary computer system 400 is shown in FIG. 4, depicting an exemplary but not limiting embodiment of a block diagram of a computer system that may be useful for implementing the present invention. Specifically, FIG. 4 illustrates computer system 400, which in an exemplary embodiment may be, but is not limited to, a personal computer (PC) system running an operating system 124 such as, e.g., but not limited to, MICROSOFT® WINDOWS® NT/98/2000/XP/etc. available from MICROSOFT Corporation of Redmond, Wash., U.S.A. In an alternative embodiment, other operating systems 124 may be used such as, e.g., but not limited to, SOLARIS® from SUN Microsystems of Santa Clara, Calif., U.S.A., OS/2 from IBM Corporation of Armonk, N.Y., U.S.A., Mac/OS from APPLE Corporation of Cupertino, Calif., U.S.A., or any of various versions of UNIX® (a trademark of the Open Group of San Francisco, Calif., USA) including, e.g., LINUX®, HPUX®, IBM AIX®, and SCO/UNIX®, etc. However, the invention may not be limited to these platforms. Instead, the invention may be implemented on any appropriate computer system running any appropriate operating system. Other components of the invention, such as, e.g., but not limited to, a computing device, a communications device, a telephone, a personal digital assistant (PDA), a handheld personal computer (PC), a subnotebook PC, a notebook PC, a laptop PC, a desktop PC, network appliance, workstation, thin client, fat client, proxy server, network communication server, remote access device, client computer, server computer, router, web server, data, media, audio, video, telephony or streaming technology server, programmable logic controller (PLC), etc., may also be implemented using a computer such as that shown in FIG. 4.

The computer system 400 may include, in an exemplary embodiment, one or more processors, such as, e.g., processor(s) 404. The processor(s) 404 may be coupled to a communication infrastructure 406 (e.g., a communications bus, backplane, cross-over bar, or network). Various software embodiments may be described in terms of this exemplary computer system. After reading this description, it will become apparent to a person skilled in the relevant art(s) how to implement the invention using other computer systems and/or architectures.

Computer system 400 may include a display interface 402 that may include, e.g., but not limited to, graphics, text, and other data, etc. from the communication infrastructure 406 (or from a frame buffer not shown) for display on display 430.

The computer system 400 may also include, e.g., but not limited to, a main memory 408, such as, e.g., but not limited to, random access memory (RAM), and a secondary memory 410, etc. The secondary memory 410 may include, for example, but not limited to, a storage device such as, e.g., but not limited to, hard disk drive 412 and/or a removable storage drive 414, representing, e.g., but not limited to, a floppy diskette drive, a magnetic tape drive, an optical disk drive, a compact disk drive CD-ROM, etc. The removable storage drive 414 may read from and/or write to a removable storage unit 418 in a well known manner. Removable storage unit 418, also called a program storage device, machine readable medium, or a computer program product, may represent, e.g., but is not limited to, a floppy disk, magnetic tape, optical disk, compact disk, etc., which may be read from and written to by removable storage drive 414. As will be appreciated, the removable storage unit 418 may include a computer usable storage medium having stored therein computer software and/or data. For example, the machine-readable medium may include flash memory devices; electrical, optical, acoustical or other form of propagated signals (e.g., carrier waves, infrared signals, digital signals, etc.), and others.

In alternative exemplary embodiments, secondary memory 410 may include other similar devices for allowing computer programs or other instructions to be loaded into computer system 400. Such devices may include, for example, (but are not limited to) a removable storage unit 422 and an interface 420. Examples of such may include a program cartridge and cartridge interface (such as, e.g., those found in video game devices), a removable memory chip (such as, e.g., an erasable programmable read only memory (EPROM), or programmable read only memory (PROM) and associated socket), and other removable storage units 422 and interfaces 420, etc., which may allow software and data to be transferred from the removable storage unit 422 to computer system 400.

Computer 400 may also include an input device such as, e.g., but not limited to, a mouse or other pointing device such as a digitizer, and a keyboard or other data entry device, etc. (none of which are labeled).

Computer 400 may also include output devices, such as, e.g., but not limited to, display 430, and display interface 402, etc. Computer 400 may include input/output (I/O) devices such as, e.g., communications interface 424, cable 428 and communications path 426. These may include, e.g., a network interface card, and modems (neither are labeled). Communications interface 424 may allow software and data to be transferred between computer system 400 and external devices. Examples of communications interface 424 may include, e.g., but not limited to, a modem, a network interface (such as, e.g., an Ethernet card), a communications port, a Personal Computer Memory Card International Association (PCMCIA) or PCCard slot and card, etc. Software and data transferred via communications interface 424 may be in the form of signals 428 which may be electronic, electromagnetic, optical or other signals capable of being received by communications interface 424. These signals 428 may be provided to communications interface 424 via a communications path (e.g., channel) 426. This channel 426 may carry signals 428 and may be implemented using, e.g., but not limited to, wire or cable, fiber optics, a telephone line, a cellular link, a radio frequency (RF) link and other communications channels, etc.

Figure 5:
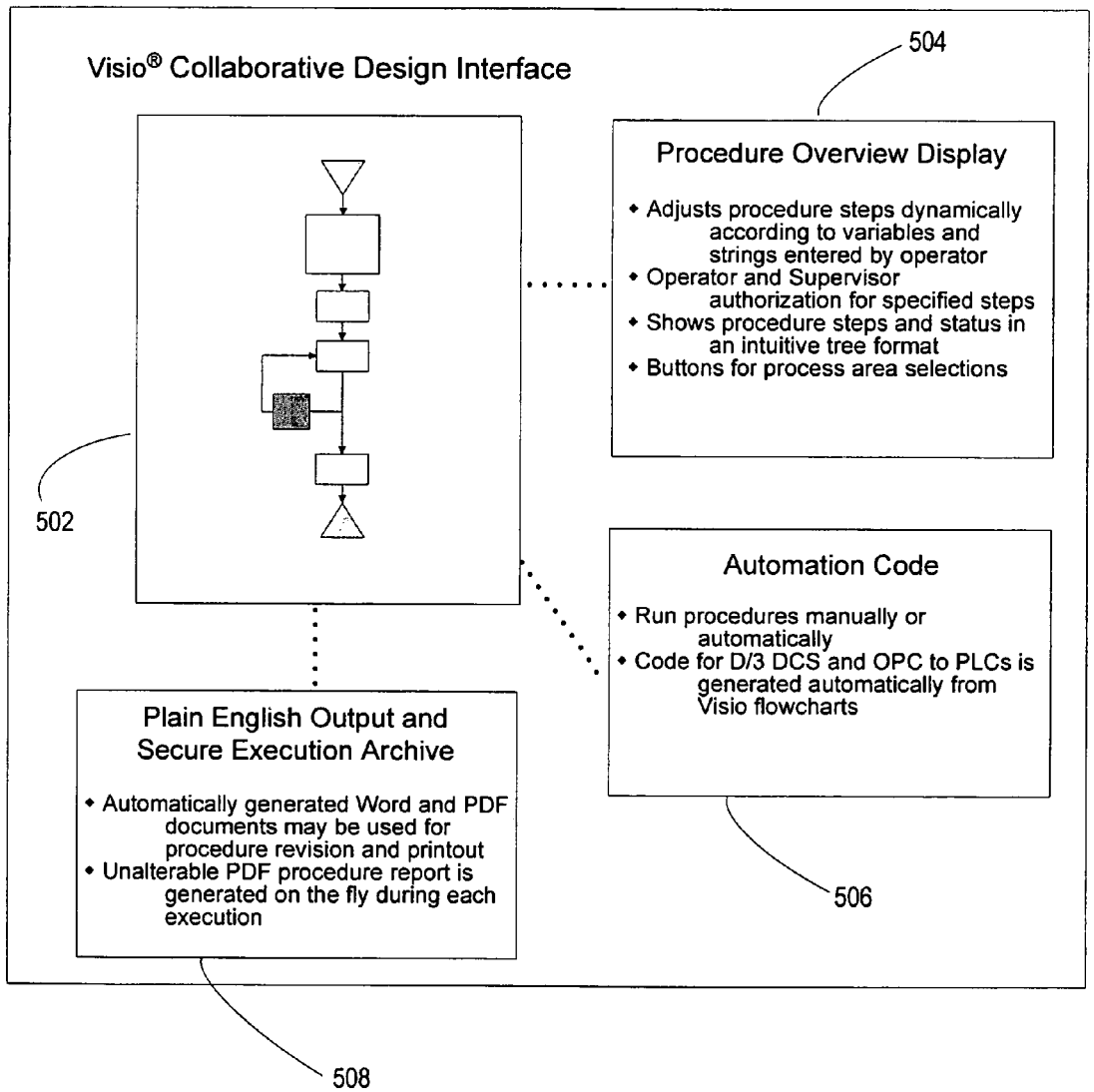
FIG. 5 depicts a composite image representing several aspects of the present invention, which can be implemented in a GUI environment, including an exemplary system for documenting a procedure graphically (VISIO® Collaborative Design Interface), an exemplary interactive procedure execution display GUI environment representing an exemplary system for managing execution automatically of a procedure (procedure overview display), computer function language (automation code), and a document (plain English output and secure execution archive) according to an exemplary embodiment of the present invention.

FIG. 5 depicts a composite image 500 representing several aspects of the present invention, which can be implemented in a GUI environment. As shown, in an exemplary embodiment, an exemplary graphical procedure documentation system 502 for documenting a procedure graphically (Paperless Procedures™ add-in to VISIO® Collaborative Design Interface available from NovaTech Process Solutions of Columbia, Md., U.S.A.) can be used to create a procedure for further use. FIG. 5 represents the exemplary graphical documentation system 502 as a cartoon of a flowchart. Advantageously, a procedure can be documented graphically, and text and associated verb object free-form textual component definitions can be captured. The exemplary graphical procedure documentation system 502 illustrated can provide an exemplary interactive procedure execution display GUI environment 504 representing an exemplary system for managing execution automatically of a procedure through a procedure overview display. The procedure overview adjust procedure steps dynamically according to variables and strings entered by the operator. Operator and/or supervisor authentication and/or comments can be captured for specified steps. The steps of the procedure can be overviewed and displayed in an intuitive hierarchical tree-based expandable-collapsible format. Buttons can be provided for process area selections. Also, the exemplary graphical procedure documentation system 502 can provide computer function language (automation code) 506 to run procedures manually or automatically, including code such as, e.g., in D/3® DCS and/or OPC format for PLCs. Finally, exemplary graphical procedure documentation system 502 can provide a document (plain English output and secure execution archive) 508 according to an exemplary embodiment of the present invention, allowing automatically generated MICROSOFT® WORD ®, or PDF documents to be used for procedure revision, printing, etc. The document can be an unalterable PDF procedure report, which can provide a log, including a timestamp, tracking of authentication, comments captured, etc.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments of the present invention may include apparatuses for performing the operations herein. An apparatus may be specially constructed for the desired purposes, or it may comprise a general purpose device selectively activated or reconfigured by a program stored in the device.

In this document, the terms "computer program medium" and "computer readable medium" may be used to generally refer to media such as, e.g., removable storage drive 414, a hard disk installed in hard disk drive 412, and signals 428. These computer program products provide software to computer system 400. The invention may be directed to such computer program products.

Computer programs (also called computer control logic), including object oriented computer programs, may be stored in main memory 408 and/or the secondary memory 410 and/or removable storage units 414, also called computer program products. Such computer programs, when executed, may enable the computer system 400 to perform the features of the present invention as discussed herein. In particular, the computer programs, when executed, may enable the processor 404 to perform the features of the present invention. Accordingly, such computer programs may represent controllers of the computer system 400.

In another exemplary embodiment, the invention may be directed to a computer program product comprising a computer readable medium having control logic (computer software) stored therein. The control logic, when executed by the processor 404, may cause the processor 404 to perform the functions of the invention as described herein. In another exemplary embodiment where the invention may be implemented using software, the software may be stored in a computer program product and loaded into computer system 400 using removable storage drive 414, hard drive 412 or communications interface 424. The control logic (software), when executed by the processor 404, may cause the processor 404 to perform the functions of the invention as described herein. The computer software may run as a standalone software application program running atop an operating system, or may be integrated into the operating system.

In yet another exemplary embodiment, the invention may be implemented primarily in hardware using, for example, hardware components such as application specific integrated circuits (ASICs), or one or more state machines. Implementation of the hardware state machine to perform the functions described herein will be apparent to persons skilled in the relevant art(s). In another exemplary embodiment, the invention may be implemented in firmware. In yet another exemplary embodiment, the invention may be implemented using a combination of any of hardware, firmware and/or software.

Embodiments of the invention may also be implemented as instructions stored on a machine-readable medium, which may be read and executed by a computing platform to perform the operations described herein. A machine-readable medium may include any mechanism for storing or transmitting information in a form readable by a machine (e.g., a computer).

Exemplary wireless communication technologies may include, e.g., but not limited to, an Infrared Data Association (IrDA)-compliant wireless technology, a short range radio frequency (RF) technology such as, e.g., but not limited to, a Bluetooth-compliant wireless technology, an IEEE standard 802.11-compliant wireless local area network (WLAN) such as, e.g., but not limited to a network compliant with IEEE Std 802.11a, b, d or g, such as, e.g., but not limited to, of version IEEE Std 802.11, 1999 Edition; or IEEE Std 802.11a-1999, IEEE Std 802.11b-1999, IEEE Std 802.11b-1999/Cor 1-2001, IEEE Std 802.11d-2001, IEEE Std 802.11-1999 (R2003), and/or IEEE 802.11g-2003, etc., a Shared Wireless Access Protocol (SWAP)-compliant wireless technology, a wireless fidelity (Wi-Fi)-compliant wireless technology, and/or an ultra wide band (UWB) wireless technology network.

In an embodiment, documents in an alterable and documents in an unalterable format, for example, executed PDF document files and approved PDF document files, may be stored on a central server. A tracking file may be archived periodically, for example, daily, and previous tracking files may be kept for a period of time, for example, 90 days. The tracking file may contain include, for example, the following information: what actions were performed by an operator with the procedure overview display, and who logged into and who logged out of the procedure overview display. A file browser may allow, for example, for the listing, ordering, and management of files pertaining to a method for managing a procedure, such as XML, PDF, and VISIO® files. Such files may be stored, for example, in groups, for example, in directories, with each group associated with a system button, such as system button 352 in FIG. 3C. An AP directory may include, for example, a top-level directory containing, or containing sub-directories that contain, files pertaining to a method for managing a procedure. The tracking file may include information on who logged into and who logged out of a file browser and on who logged into and who logged out of an AP directory. Wave files may include sounds used in a method for managing a procedure, for example, sounds used to alert an operator to an alarm or other condition of a process. The tracking file may include information on who logged into and who logged out of a wave configuration routine and on what changes to the configuration of a wave file were made. The tracking file may also include information on hash code mismatches found in a procedure overview display, hash code mismatches found in a file browser, hash code generation during conversion of information in a VISIO® format to information in an XML format, and hash code generation by a file browser.

A procedure for automatic execution may allow for the visual display of a current process value or process state on the procedure overview display. For example, during automatic execution of a procedure, the current temperature of material in a vat measured by a thermocouple may be presented on a procedure overview display. A procedure for automatic execution may include one or more breakpoints. The procedure may execute automatically until a breakpoint is reached. The operator may be prompted at the breakpoint to provide information, such as a value or values or a response to a query, such as whether to continue with automatic execution.

In an embodiment, the display of an alarm message during execution of a procedure for automatic execution may be indicated in the executed PDF file produced from execution of the procedure.

While various exemplary embodiments of the present invention have been described above, it should be understood that they have been presented by way of example only, and not limitation. Thus, the breadth and scope of the present invention should not be limited by any of the above-described exemplary embodiments, but should instead be defined only in accordance with the following claims and their equivalents.

What is claimed is:

1. A computer-implemented method for managing a process, comprising the steps of:
   (a) receiving the process by
      receiving input of visual operation information in a graphical visual procedure interface format, and
      receiving a free form text description;
   (b) converting said visual operation information from said graphical visual procedure interface format and said free form text description to a data container language format; and
   (c) converting data in said data container language format to a computer function language format, sending data in said computer function language format to interpreters for multiple real-time feedback control units, and allowing the interpreters to automatically execute the process represented by the data, and including an alarm response routine with visual operation information, wherein said alarm response routine in the computer function language format is capable of causing interactive display of a step or steps of a procedure in the process in response to an alarm condition;
      wherein the multiple real-time feedback control units use information of the physical state of a chemical or material which the process transforms
   (d) displaying information from data in said data container language format in a procedure overview display;
   (e) allowing an operator to update said data in said data container language format, generating an image document in a secure format from said updated data in said data container language format, and electronically filing said image document in a secure format with a regulatory organization.

2. The computer-implemented method of claim 1, wherein the free form text description is of a pre-defined length.

3. The computer-implemented method of claim 1, wherein said receiving a free form text description comprises
   receiving a verb description, which is entered by a user or selected by a user from a list of sample verb descriptions; and
   receiving an object description, which is entered by a user or selected by a user from a list of sample object descriptions.

4. The computer-implemented method of claim 1, said (a) further comprising at least one of:
   receiving a data validation range;
   receiving an authentication request;
   receiving a function call request; or
   receiving other step parameters about said visual operation information.

5. The computer-implemented method of claim 1, further comprising the step of
   (f) providing a document file from data in said data container language format.

6. The computer-implemented method of claim 1, wherein the visual operation information comprises a multi-section procedure.

7. The computer-implemented method of claim 1, further comprising the step of
   (f) displaying step-by-step interactive usage of the process.

8. The computer-implemented method of claim 7, wherein said step-by-step interactive usage of the process is displayed in real time.

9. The computer-implemented method of claim 7, further comprising
(g) monitoring said step-by-step interactive usage of the process including providing a document file from data in said data container language format.

10. The computer-implemented method of claim 9, wherein said (g) comprises (1) recording progress of the process.

11. The computer-implemented method of claim 10, wherein said (1) comprises at least one of:
(A) recording an automatically executed sequential step or automatically executed sequential steps in said document file;
(B) recording timing of completion of a sequential step in said document file;
(C) recording values from the user in said document file;
(D) recording an automatically measured value in said document file;
(E) recording comments from the user in said document file;
(F) recording results in said document file; or
(G) recording authentication in said document file.

12. The computer-implemented method of claim 7, further comprising:
(1) prompting a current sequential step of the process to a user; and
(2) receiving a response from the user.

13. The computer-implemented method of claim 12, wherein said (1) comprises at least one of:
(A) prompting for at least one sequential procedure;
(B) prompting a graphical symbol to indicate progress of usage of the process;
(C) prompting at least one of a color or a shading, to indicate progress of the process;
(D) prompting by displaying an expandable/collapsible hierarchical tree;
(E) prompting the user for a value;
(F) prompting for an authentication by at least one of an operator, an engineer, or a supervisor;
(G) providing a validation of said value according to a range;
(H) prompting a step execution request; or
(I) prompting a function call request.

14. The computer-implemented method of claim 12, wherein said (2) comprises at least one of:
(A) receiving a selection of at least one sequential procedure;
(B) receiving a response indicating completion of said current sequential step;
(C) receiving a response indicating skipping said current sequential step;
(D) receiving a response requiring automatic execution of said current sequential step or said current sequential step with a set of steps;
(E) receiving a value;
(F) receiving a response including a comment;
(G) receiving an authentication from at least one of an operator, an engineer, or a supervisor; or
(H) receiving a function call request.

15. The computer-implemented method of claim 1, including a monitor function and a monitor response routine with visual operation information,
wherein said monitor function in a computer function language format is capable of initiating automatic execution of a step or steps of said monitor response routine in response to a condition.

16. The computer-implemented method of claim 1, further comprising: outputting a status of execution from said interpreter; and converting said status of execution to a document in an alterable format.

17. The computer-implemented method of claim 16, further comprising:
generating an image document in a secure format from said document in an alterable format.

18. The computer-implemented method of claim 1,
wherein said computer function language format comprises at least one of
Sequence and Batch Language or
an object linking and embedding for process control compliant language.

19. The computer-implemented method of claim 1,
wherein data in said computer function language format comprises information for programming at least two distributed control units.

20. The computer-implemented method of claim 1, further comprising:
(f) providing a document file from said updated data in said data container language format.

21. The computer-implemented method of claim 1, further comprising the step of electronically filing said updated data in said data container language format with a regulatory organization,
wherein said data container language is selected from the group consisting of Extensible Markup Language (XML) and Standard Generalized Markup Language (SGML).

22. The computer-implemented method of claim 21,
wherein said regulatory organization is U.S. Food and Drug Administration or U.S. Department of Energy.

23. The computer-implemented method of claim 1, further comprising the step of
(f) generating an image document in a secure format from said data in said data container language format.

24. The method of claim 1, further comprising the steps of
generating a document in an alterable format from data in said data container language format and
generating an image document in a secure format from said document in an alterable format.

25. The method of claim 23,
wherein said secure format comprises a PORTABLE DOCUMENT FORMAT (PDF) format.

26. The computer-implemented method of claim 23, further comprising the step of
(e) time stamping said image document.

27. The computer-implemented method of claim 23,
wherein said secure format comprises a format accepted by a regulatory organization.

28. The computer-implemented method of claim 27,
wherein the regulatory organization comprises at least one of
U.S. Food and Drug Administration (FDA),
U.S. Nuclear Regulatory Commission (NRC),
U.S. Department of Agriculture (USDA),
U.S. Department of Energy (DOE),
U.S. Department of Defense (DOD),
U.S. Department of Health and Human Services (DHHS),
International Organization for Standardization,
a governmental agency,
a private certification organization, or
a quasi-governmental organization.

29. The computer-implemented method of claim 1, further comprising the step of generating a document in an alterable format from said data container language format.

30. The computer-implemented method of claim 1, wherein said graphical visual procedure interface format comprises a diagramming software-compatible extended graphical application.

31. The computer-implemented method of claim 1, wherein said data container language format comprises Extensible Markup Language (XML).

32. The computer-implemented method of claim 1, wherein the process comprises at least one of:
    a chemical process;
    a material handling process; or
    a drug manufacturing process.

33. The computer-implemented method of claim 32, wherein the process further comprises at least one of:
    a health services process;
    an emergency response process;
    a military operation;
    a military service process;
    an electrical generation process; or
    an electrical distribution process.

34. The computer-implemented method of claim 32, wherein the process comprises a real process or a simulated process.

35. The computer-implemented method of claim 1, further comprising at least one of the steps of:
    receiving at least a portion of said visual operation information from a visual operation information library; or
    storing at least a portion of said visual operation information in said visual operation information library.

36. The computer-implemented method of claim 1, further comprising mapping a procedural description to generate visual operation information.

37. The computer-implemented method of claim 1, further comprising
    including a monitor function and a monitor response routine with visual operation information,
    wherein said monitor function in a computer function language format is capable of initiating automatic execution of a step or steps of said monitor response routine in response to the alarm condition.

* * * * *

UNITED STATES PATENT AND TRADEMARK OFFICE
CERTIFICATE OF CORRECTION

PATENT NO. : 7,590,942 B2  Page 1 of 1
APPLICATION NO. : 10/942088
DATED : September 15, 2009
INVENTOR(S) : Phillips et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1073 days.

Signed and Sealed this

Twenty-first Day of September, 2010

David J. Kappos
*Director of the United States Patent and Trademark Office*